United States Patent [19]

Tomatis

[11] Patent Number: 4,664,613
[45] Date of Patent: May 12, 1987

[54] MOLDING AND HARDENING MACHINE FOR PASTA FILATA CHEESE

[75] Inventor: Stefano Tomatis, Peveragno, Italy

[73] Assignee: CMT Costruzioni Meccaniche e Tecnologia S.p.A., Milan, Italy

[21] Appl. No.: 864,916

[22] Filed: May 19, 1986

[30] Foreign Application Priority Data

May 20, 1985 [FT] Italy .............................67459 A/85

[51] Int. Cl.⁴ .................... A21C 19/084; B29C 43/50; B29C 41/42; B29C 43/46
[52] U.S. Cl. .................................. 425/182; 249/120; 249/137; 425/350; 425/447
[58] Field of Search .................... 425/447, 348 R, 350, 425/351, 182, 190, 192 R, 195; 249/120, 137

[56] References Cited

U.S. PATENT DOCUMENTS

| | | | |
|---|---|---|---|
| 2,573,365 | 10/1951 | Scholes et al. | 425/350 |
| 2,891,281 | 6/1959 | Heinzelman | 425/348 R |
| 3,633,245 | 1/1972 | Partos | 425/348 R |
| 3,891,375 | 6/1975 | Pilewski | 425/348 R |

FOREIGN PATENT DOCUMENTS 433591  8/1935  United Kingdom ................ 425/195

Primary Examiner—Willard E. Hoag
Attorney, Agent, or Firm—Guido Modiano; Albert Josif

[57] ABSTRACT

The machine, which is adapted to be continuously fed with pasta filata, comprises:
(a) a horizontal, circular table, having a first radial aperture adapted to be supplied with pasta filata and a second radial aperture for delivery of the product;
(b) a shaft protruding vertically from the table center and driven by stepping motor means located beneath the table, and having an integral wheel provided with a peripheral rim;
(c) a set of sector-shaped plates adapted to abut against said rim to form a full ring, each sector-shaped plate being slidably supported on the table and being provided with a plurality of radially aligned rows of vertical molding tubes opening at their bottoms through the plate and housing respective slidable pistons, so that each row of molding tubes will straddle a desired aperture of said first or second radial apertures for predetermined angular positions of said wheel;
(d) fastening means for clamping said sector-shaped plates to said wheel rim;
(e) water spraying means located above the sector-shaped plates for spraying the molding tubes with cold water.

5 Claims, 4 Drawing Figures

MOLDING AND HARDENING MACHINE FOR PASTA FILATA CHEESE

BACKGROUND OF THE INVENTION

This invention is concerned with a molding and hardening machine for pasta filata cheese, adapted to be connected to a pasta filata stretching machine, for the production of mozzarella or provolone in cylinder shapes.

Continuous stretching and molding machines are known for producing mozzarella and provolone in cylindrical shapes, wherein one or more molding tubes are filled and emptied in turn with pasta filata at respective filling and delivery stations, the tubes being displaced by means of alternating slides or rotating carrousels. In either case the cylindrical cheeses delivered by the tube, being still warm and therefore plastic, have to be collected into stiff containers, where they are held during their hardening, which is generally effected by dipping in cold water. After hardening, the cheeses are shaken out of their containers for subsequent further processing, such as salting, and are finally packaged for marketing or for aging.

The above steps of moving the cheeses into and out of said stiff containers are time-consuming, labor-demanding, and require a large number of said containers for prolonged stocking of a given batch of production in cold water. The operations involved are toilsome for the workmen and the hourly production is limited by the awkwardness of the manual steps.

SUMMARY OF THE INVENTION

It is therefore the main object of the invention to mechanize the production of pasta filata cheese such as mozzarella and provolone in cylindrical shapes, by providing a continuous molding and hardening machine for pasta filata cheese which is adapted to be continuously fed with pasta filata in order to mold and harden the cheeses in a single, fully mechanized step.

A further object of the invention is to provide a machine as defined above, and which is adapted to produce a wide range of sizes by adjustment and/or replacement of a limited number of parts that are easy to handle.

The invention achieves such objects by providing a molding and hardening machine for pasta filata cheese, adapted to be continuously fed with pasta filata, and comprising:

(a) a horizontal, circular table, having a first radial aperture adapted to be supplied with pasta filata and a second radial aperture for delivery of the product;

(b) a shaft protruding vertically from the table center and driven by stepping motor means located beneath the table, and having an integral wheel provided with a peripheral rim;

(c) a set of sector-shaped plates adapted to abut against said rim to form a full ring, each sector-shaped plate being slidably supported on the table and being provided with a plurality of radially aligned rows of vertical molding tubes opening at their bottoms through the plate and housing respective slidable pistons, so that each row of molding tubes will straddle a desired aperture of said first or second radial apertures for predetermined angular positions of said wheel;

(d) fastening means for clamping said sector-shaped plates to said wheel rim; and (e) water spraying means located above the sector-shaped plates for spraying the molding tubes with cold water.

BRIEF DESCRIPTION OF THE DRAWINGS

The invention is further described with reference to a preferred embodiment, shown in the annexed drawings, wherein.

DESCRIPTION OF THE PREFERRED EMBODIMENT

With reference to the Figures, the molding and hardening machine according to the preferred embodiment of the invention comprises a circular, stationary table 10, resting horizontally on a pedestal 12, and having an upper facing of a self-lubricating synthetic material such as polytetrafluoroethylene or the like. Table 10 has a first radial aperture or slot 14, adapted to be connected by conventional means to a continuous pasta filata stretching machine (not shown), so that the stretching machine can feed pasta filata to the aperture 14 from beneath, as will appear more clearly below. The pasta filata stretching machine can be, for example, a stretching unit as disclosed in the allowed U.S. patent appln. Ser. No. 725,164, filed by the same Applicant on Apr. 23, 1985, for "Stretching and moulding machine for pasta filata cheese". The table has a second radial aperture 16 for delivery of the hardened product, aperture 16 being wider than aperture 14 and relatively close to it.

Figure 1:
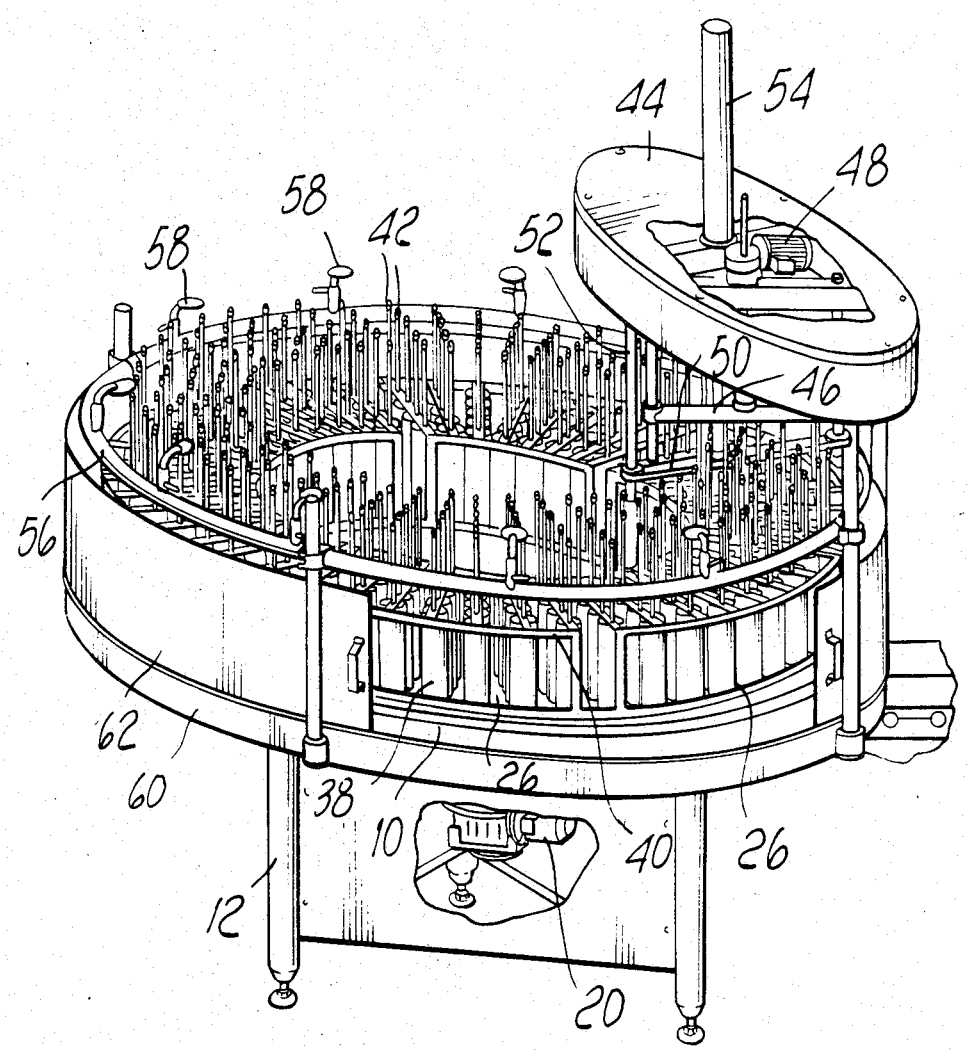
FIG. 1 is a perspective view of a molding and hardening machine according to the preferred embodiment.
Figure 2:
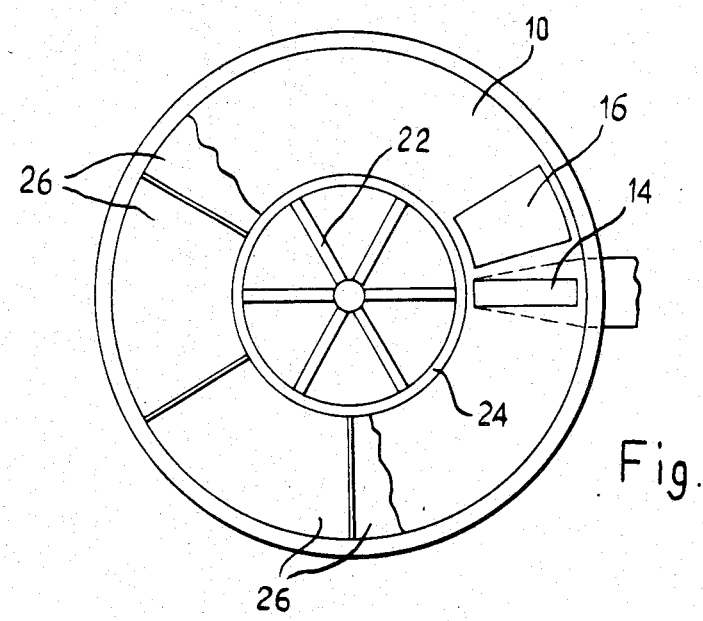
FIG. 2 is a schematic plan view of the machine of FIG. 1, where an overhanging frame is removed.
Figure 3:
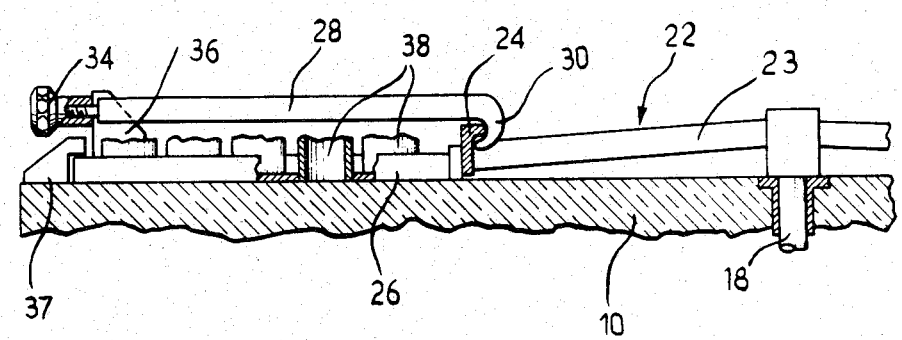
FIG. 3 is a view in radial cross-section, on an enlarged scale, of a detail of the machine of FIG. 1.
Figure 4:
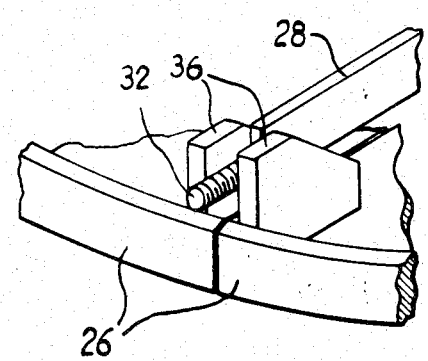
FIG. 4 is a perspective view of another detail of the machine of the above Figures.

Table 10 has a central bore where a vertical shaft 18 is rotatably supported. Shaft 18 is driven by a motor 20 with reduction gear mounted beneath table 10, within pedestal 12, and carries at its upper end, above the table, a wheel 22 (not shown in FIG. 1 to avoid cluttering the drawing) comprising a peripheral, stepped rim 24.

A number of sector-shaped plates 26 (preferably six), resting slidably upon the table 10, embrace wheel 22 and abut with their inside edges 27 against rim 24, and are fastened by tie rods 28 each having a hook 30 at one end for grasping the step of rim 24, and being threaded at the other end 32 for engaging a hand nut 34, which reacts against abutments 36 on adjacent sector plates. By tightening nuts 34, the sector plates are not only abutted against wheel 22, but also are abutted laterally against one another, thereby forming one rigid structure together with wheel 10.

Retaining brackets 37 are preferably provided at intervals along the periphery of table 10, in order to retain sector plates 26 against lifting from the surface of the table.

Each sector plate 26 further supports a plurality of radially aligned rows of molding tubes 38, each opening at the bottom through the plate, with a frame 40 for bracing the tubes. A piston (not shown in the drawings) having an upper push rod 42 is slidably received within each of the tubes 38.

An overhanging frame 44 is mounted above the apertures 14 and 16 in table 10. Frame 44 supports a first horizontal abutment beam 46, aligned with the feeding aperture 14, and vertically adjustable by means of a motor 48 with reduction gear, although a manual adjustment could also be envisaged.

Frame 44 also supports slidably a second horizontal beam 50, acting as a product ejector, aligned with delivery aperture 16. Beam 50 is slidable in vertical guides 52, and is driven by a hydraulic or pneumatic drive 54.

Water spraying means are supported from the periphery of table 10, at a height above the molding tubes 38. The water spraying means comprise a peripheral pipe 56, supplied with chilled water and provided at intervals with shower-spouts 58 adapted to direct a spray of water toward the sector plates 26 (although a continuous row of jets might be substituted for the individual spouts). The sprayed water is drained by a peripheral gutter 60 embracing table 10. Preferably, removable screens or shields 62 are also provided for preventing the sprayed water from spreading outside the machine.

In operation, the machine described above is continuously supplied with pasta filata at its supply aperture 14, while motor 20 is still and a row of molding tubes 38 is standing above said aperture. Tubes 38 are therefore filled with pasta filata, and push rods 42 rise up to abutment with the abutment beam 46, which determines the filling level of the tubes, so that the cheeses have a uniform and predetermined size. The position of beam 46 is adjusted before starting processing, depending on the required cheese size.

When the tubes are completely filled (which can be determined automatically by microswitches sensing the abutment of the push rods against the abutment beam, not shown because they are obvious for a person skilled in the art) motor 20 is activated, for stepping forward wheel 22, thus bringing the next row of molding tubes into alignment with the supply aperture. The filling step can thus be repeated. All the molding tubes are thus progressively filled, and these are sprayed with chilled water from spouts 58, so that the product contained in the tubes is cooled and thus progressively hardened.

When a row of filled tubes arrives above the delivery aperture 16, and while the nearby group of tubes is being filled at the filling station, drive 54 is activated to lower beam 54, thus pushing down the push rods and causing the pistons in the tubes to eject the cheeses through their open bottoms and into the delivery apertures. The cheeses ejected from the tubes have been cooled during a full revolution of wheel 22, and are therefore sufficiently hardened for keeping their shape even when they are free from their containers. The ejected cheeses thus fall through the delivery aperture 16 into processing means not shown because they are not part of the invention. The emptied tubes are then again filled at the next step.

Sensing means and control means, obvious for a person skilled in the art, can be provided for sensing the completion of the filling and emptying steps and for controlling motor 20 and drive 54, so that the operation of the machine proceeds automatically.

Among the most advantageous features of the invention is the ease of changing the cheese size, by replacing the sector-shaped plates with a different set having molding tubes of a different gauge, since the sector-shaped plates have a size and weight easy to handle manually, without use of winches or the like. The number of molding tubes can be different for different sector-shaped plates, without affecting the operation of the machine (say three, four or six tubes instead of five as shown in the drawings).

While a preferred embodiment of the invention has been described above, it is understood that changes can be made to it within the teachings of the invention, and that the scope of the invention is only defined by the attached claims.

I claim:

1. A molding and hardening machine for pasta filata cheese, adapted to be continuously fed with pasta filata, characterized in that it comprises:
    (a) a horizontal, circular table, having a first radial aperture adapted to be supplied with pasta filata and a second radial aperture for delivery of the product;
    (b) a shaft protruding vertically from the table center and driven by stepping motor means located beneath the table, and having an integral wheel provided with a peripheral rim;
    (c) a set of sector-shaped plates adapted to abut against said rim to form a full ring, each sector-shaped plate being slidably supported on the table and being provided with a plurality of radially aligned rows of vertical molding tubes opening at their bottoms through the plate and housing respective slidable pistons, so that each row of molding tubes will straddle a desired aperture of said first or second radial apertures for predetermined angular positions of said wheel;
    (d) fastening means for clamping said sector-shaped plates to said wheel rim; and
    (e) water spraying means located above the sector-shaped plates for spraying the molding tubes with cold water.

2. The molding and hardening machine for pasta filata cheese of claim 1, characterized in that the fastening means comprises a set of tie rods, each having a hooked end for grasping said rim and an opposite threaded end adapted to be engaged by a nut reacting against abutments on two adjacent sector-shaped plates.

3. The molding and hardening machine for pasta filata cheese of claim 1, characterized in that a horizontal, radial abutment beam is mounted at an adjustable height above said radial supply aperture, for abutment of the upper ends of said pistons housed in said molding tubes.

4. The molding and hardening machine for pasta filata cheese of claim 1, characterized in that an ejector beam is slidably mounted in vertical guides above said delivery aperture in the table, and is provided with motor means adapted to lower the beam for pushing down the pistons in a row.

5. The molding and hardening machine for pasta filata cheese of claim 1, characterized in that said water spraying means comprise a peripheral pipe around the table and elevated with respect to it, having shower-spouts at intervals and adapted to be supplied with cold water.

* * * * *